Figure 1:
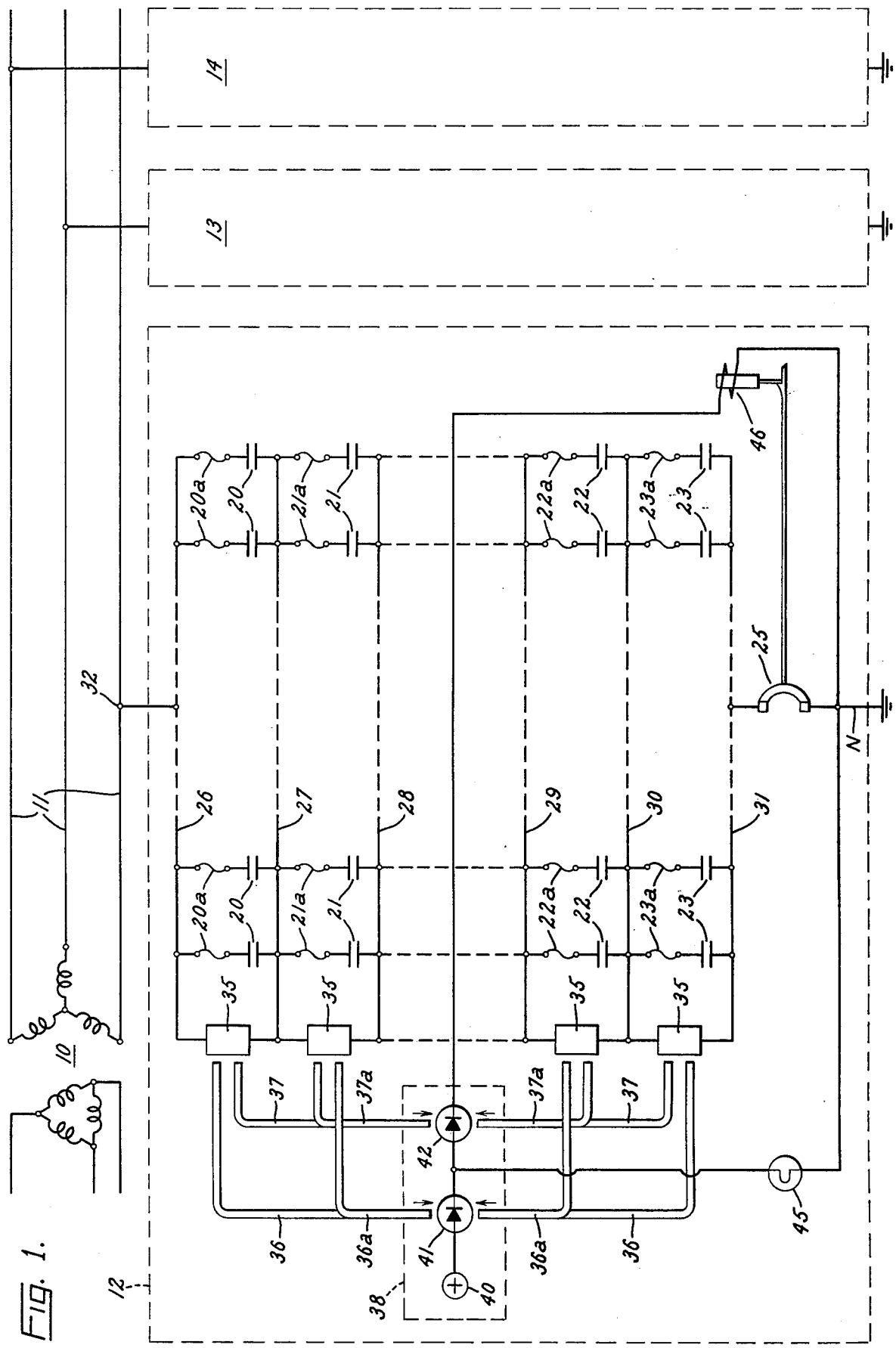

United States Patent [19]

Titus

[11] 3,973,169
[45] Aug. 3, 1976

[54] OVERVOLTAGE PROTECTION FOR HIGH VOLTAGE SHUNT CAPACITOR BANKS

[75] Inventor: Charles H. Titus, Newtown Square, Pa.

[73] Assignee: General Electric Company, Philadelphia, Pa.

[22] Filed: Dec. 10, 1974

[21] Appl. No.: 531,410

[52] U.S. Cl. .............................. 317/12 B; 317/31; 317/137; 317/DIG. 5; 324/127
[51] Int. Cl.² .......................................... H02H 7/16
[58] Field of Search ................. 317/12 B, 12 R, 31, 317/137, 155.5, DIG. 5; 324/127

[56] References Cited
UNITED STATES PATENTS

| | | | |
|---|---|---|---|
| 1,483,552 | 2/1924 | Packard | 317/12 |
| 2,888,613 | 5/1959 | Cuttino | 317/12 |
| 2,931,950 | 4/1960 | Minder | 317/12 B |
| 2,933,652 | 4/1960 | Cuttino | 317/12 |
| 2,942,153 | 6/1960 | Schultz et al. | 317/12 B |
| 3,080,506 | 3/1963 | Minder | 317/12 |
| 3,188,526 | 6/1965 | Engel | 317/137 |

*Primary Examiner*—Harry Moose
*Attorney, Agent, or Firm*—J. Wesley Haubner

[57] ABSTRACT

An integral shunt capacitor bank connected between high voltage AC terminals and comprising a plurality of serially-connected groups of paralleled capacitors is provided with a dual level overvoltage detection circuit between the paralleling buses defining each capacitor group. Each dual level detection circuit includes a voltage measuring impedance providing a low variable voltage proportional to the voltage to be measured and a pair of voltage responsive circuits across the measuring impedance. The voltage responsive circuits comprising each such pair are responsive to different overvoltage levels and include oppositely poled blocking rectifiers.

7 Claims, 2 Drawing Figures

OVERVOLTAGE PROTECTION FOR HIGH VOLTAGE SHUNT CAPACITOR BANKS

My invention relates to overload protection for electric capacitors, and particularly to overvoltage protection of shunt capacitor banks comprising series-connected groups of paralleled capacitors between high voltage terminals of an electric power system.

High voltage banks of capacitors comprising a plurality of parallel-connected capacitor groups in series are well known for power factor correction on alternating current transmission and distribution circuits and also for use in high voltage harmonic filters associated with power rectifiers and inverters in high voltage direct current systems of power transmission.

When a large amount of capacitive reactance is required in a high voltage system it is standard practice to connect a large number of relatively small capacitors of standard KVA and voltage rating in paralleled groups each comprising a plurality of capacitors in parallel circuit relation, and to connect a plurality of such paralleled groups in series between high voltage terminals. For any selected capacitor rating the number of series connected capacitor groups is determined by the voltage to be imposed across the bank. For example, such a bank may comprise ten capacitors connected between paralleling buses which define each capacitor group with ten such parallel-connected groups in series between line voltage and ground potential in each leg of a wye-connected, three phase bank of capacitors. On a 230 volt system each such leg may be exposed to a repetitive peak voltage of 200,000 volts, or 20,000 volts across the parallel-connected group of capacitors at each voltage level.

In such capacitor banks it is usual to provide an individual fuse in series with each capacitor between paralleling buses at each voltage level. If any one fuse in a group of paralleled capacitors operates to disconnect a capacitor the impedance of that paralleled group increases. Total voltage across the bank then no longer divides equally among the series-connected groups, but increases on the group containing the faulted capacitor or capacitors. Standard capacitors are designed for continuous operation at 110% of rated voltage. If overvoltage of more than 10% occurs on any group of parallel-connected capacitors, as due to removal of one or more from the group by fuse operation, the remaining capacitors in the group are endangered.

The magnitude of overvoltage imposed upon any capacitor group depends of course upon the number of paralleled capacitors in the group. Desirably each group comprises a sufficient number of capacitors that the voltage rise caused by removal of one capacitor is no greater than 10%. It is desirable however to provide protective means for ensuring that no greater overvoltage is imposed upon the remaining capacitors, and many such arrangements have devised.

In order to detect overvoltage on paralleled group of capacitors in a series-connected bank it is the usual practice to utilize unbalance of voltage between normally equipotential points on two or more capacitor banks in parallel between high voltage terminals. To provide such differential voltage detection, of course, a capacitor installation must be divided into at least two banks (so that the capacitors at any one voltage level are in several separate groups), or else a separate reference voltage divider must be connected across the high voltage terminals.

It is not always desirable to divide an installation into several banks of small paralleled groups. Each group should contain sufficient capacitors that overvoltage due to removal of a single capacitor will be limited to no more than 10%. Also, each group should contain sufficient capacitors that the fault current through any short-circuited capacitor will clear the associated fuse before the casing of the faulted capacitor ruptures. Even if a separate reference voltage divider is connected in parallel with a single capacitor bank, detection by voltage unbalance is subject to faulty operation as a result of external system disturbance. Moreover, the calibration of a voltage unbalance detector is adversely affected by the presence of harmonic voltages. In harmonic filters therefore, it is especially desirable to avoid detection arrangements responsive to voltage unbalance.

Accordingly it is a general object of my invention to provide improved means for directly detecting overvoltage at each voltage level of a shunt capacitor bank which comprises a single series string of parallel-connected groups of capacitors.

It is a more particular object of my invention to provide improved overvoltage protection means in shunt capacitor banks in harmonic filters for electric power transmission lines.

It is still another object of my invention to provide, at each voltage level of a single series-connected string of paralleled groups of capacitors, protective means sequentially responsive to two levels of overvoltage for performing discrete protective functions.

In carrying out my invention in one preferred embodiment I utilize separate dual level overvoltage detection circuits connected across each parallel-connected group of a plurality of capacitor groups connected in series between high voltage terminals. Each detection circuit comprises a capacitive voltage divider providing a low variable voltage proportional to the voltage across a group of capacitors in parallel and a pair of oppositely poled unilaterally conductive circuits responsive to that low voltage. Each voltage responsive circuit includes a voltage responsive discharge device operable at one of two preselected overvoltage levels. Signal means responsive to unidirectional current flow initiated in response to the lowest level of overvoltage actuates an alarm; signal means responsive to unidirectional current flow initiated in response to the higher level of overvoltage actuates a disconnect switch.

Figure 2:
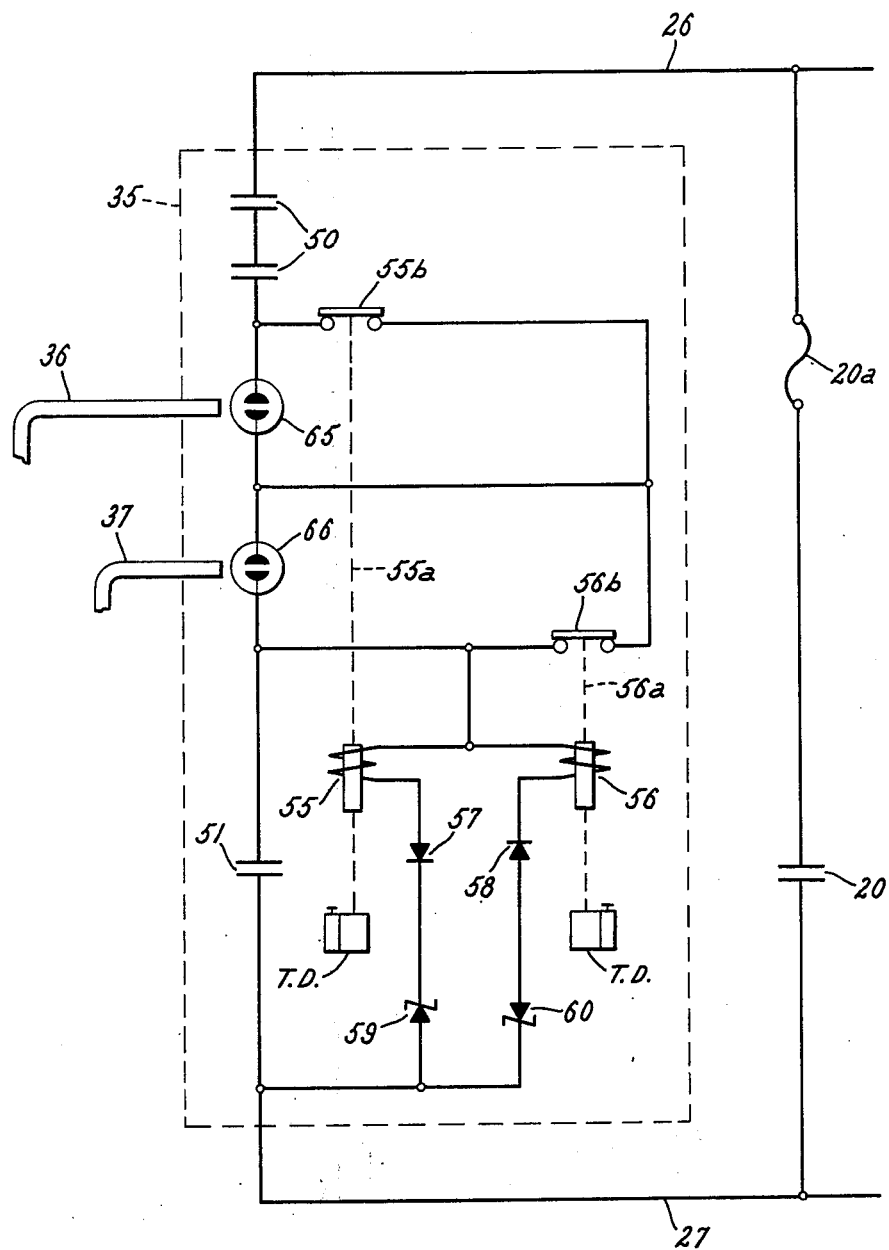

My invention will be more fully understood and its various objects and advantages further appreciated by referring now to the following detailed specification taken in conjunction with the accompanying drawing wherein:

FIG. 1 is a schematic circuit diagram of a high voltage shunt capacitor bank embodying my invention, and FIG. 2 is a schematic circuit diagram of a single overvoltage detection circuit of the type utilized at each voltage level in the capacitor bank of FIG. 1.

Referring now to the drawing, I have shown a three phase electric power supply circuit comprising a power transformer 10 having secondary windings connected in wye circuit relation to three high voltage line conductors 11. Three high voltage capacitor banks 12, 13 and 14 are connected in wye circuit relation between the several line conductors 11 and a neutral terminal N which may, if desired, be grounded as shown. The capacitor banks 12, 13 and 14 are essentially identical, and for the purpose of simplification the banks 13 and 14 have been indicated by block diagram with the internal circuitry of only the capacitor bank 12 being illustrated on the drawing.

As illustrated at FIG. 1 the capacitor bank 12 comprises a plurality of parallel-connected groups of capacitors 20, 21, 22, 23 connected in series circuit relation in a single series circuit between a high voltage line terminal 32 and ground through a circuit breaker 25. The single series circuit includes paralleling buses 26, 27, 28, 29, 30, 31 at intermediate voltage levels between the high voltage terminal 32 and ground, all the capacitors at each voltage level being connected between the same pair of paralleling buses to constitute a single capacitor group. Each of the capacitors 20–23 is individually fused by connection of one of the fuses 20a, 21a, 22a, and 23a in series with each capacitor between associated paralleling buses.

It will be understood by those skilled in the art that the number of capacitors in any parallel-connected capacitor group may be any desired number. This has been indicated on the drawing by illustrating each group as a pair of parallel-connected capacitors at opposite ends of each paralleling bus with intermediate portions of the buses being shown in dotted lines to indicate any desired extension of the number of capacitors in the group. Similarly, the number of series-connected groups of capacitors may be any desired number. This has been indicated on the drawing by illustrating the series connection of capacitor groups as two groups adjacent the high voltage terminal 32 and two groups adjacent the ground terminal, with parallel lines therebetween indicating any desired number of intermediate capacitor groups in a series string.

In order to protect the capacitors 20–23 against the imposition of destructive overvoltage I have illustrated at FIG. 1 a dual level overvoltage detector 35 connected between each electrically adjacent pair of paralleling buses 26–31. Each overvoltage detector 35 is arranged to generate overvoltage signals at two discrete, spaced-apart overvoltage levels. A pair of separate signal transmission channels associated with each dual level detector 35 transmit the respective high level and low level overvoltage signals to a common control unit 38 at ground potential. The signal transmission channels are illustrated as light guides 36, 36a, 37, 37a each having two input branches associated with a pair of electrically adjacent overvoltage detectors 35. The guides 36, 36a transmit low level overvoltage signals and the guides 37, 37a transmit high level overvoltage signals. At each signal level a single light guide is associated with two electrically adjacent detectors by connecting these detectors to a common paralleling bus in a manner to be described hereinafter.

By way of example I have illustrated the control unit 38 as comprising a source 40 of low unidirectional control voltage and a pair of light responsive diodes 41, 42. The light responsive diode 41 is rendered conductive in response to low level overvoltage signals transmitted through light guides 36, 36a and connects an indicating lamp 45 to the control voltage source 40. The light responsive diode 42 is responsive to high level overvoltage signals transmitted through light guides 37, 37a and connects a trip coil 46 of the circuit breaker 25 to the voltage source 40.

At FIG. 2 I have shown a single overvoltage detector 35 of FIG. 1 which provides a dual level response in accordance with my invention. Components common to those shown at FIG. 1 have been assigned the same reference numerals. As illustrated, at FIG. 2 the detector 35 is connected in shunt circuit relation to one capacitor group, such as the capacitor group 20 between the paralleling buses 26–27, and comprises a voltage divider including a pair of relatively small capacitors 50 and a relatively large capacitor 51. One terminal of the large capacitor 51 is connected to the intermediate paralleling bus 27. The capacitors 50 and 51 are preferably so proportioned that, whatever may be the normal voltage between paralleling buses 26 and 27, only 100 volts normally appears across the capacitor 51.

I utilize the capacitor 51 as a measuring impedance by connecting between its terminals signal generating means responsive to excess voltage. At FIG. 2 I have shown two unilaterally conductive signal generating circuits connected in parallel circuit relation across the capacitor 51 and responsive to different overvoltage levels. Each signal generating circuit comprises a relay actuating winding, a blocking rectifier and voltage responsive break down device such as a Zener diode. Specifically, actuating windings 55 and 56 of a pair of relays 55a, 56a are connected in parallel circuit relation across the measuring terminals of capacitor 51 through oppositely poled blocking diodes 57, 58, respectively, and oppositely poled Zener diodes 59 and 60, respectively. The Zener diodes 59 and 60 are so calibrated that the Zener 59 breaks down at 110% of the voltage normally appearing across the capacitor 51, for example at 110 volts. Due to the blocking diode 57 the relay coil 55 is thereupon energized on alternate half cycles of the alternating voltage across capacitor 51. Similarly the Zener diode 60 is calibrated to break down and become conductive at a higher predetermined overvoltage level, such as 120% of normal voltage across the measuring capacitor 51. At that voltage level, and with the unilaterally conductive circuit through relay coil 55 still energized, the Zener diode 60 breaks down thereby to energize the relay winding 56 on half cycles of opposite polarity, so that at this higher level of overvoltage both parallel connected relay circuits are energized.

In order to generate discrete overvoltage signals at the several overvoltage levels determined by the Zener diodes 59, 60 I prefer to utilize a pair of low voltage light generating devices, such as a pair of neon lamps 65, 66, connected in series circuit relation with the capacitors 50, 51 and electrically adjacent the capacitor 51. The neon lamps are thus maintained at a low voltage with respect to the voltage of the paralleling bus 27, i.e., in the example given only 100 volts above the voltage of bus 27. The neon lamps 65, 66 are positioned optically adjacent the light guides 36, 37, respectively, but are normally shunted by separate circuits each of which includes a normally closed contact of one of the relays 55a, 56a. Specifically, a shunt circuit around the neon lamp 65 includes a normally closed contact 55b on relay 55a, and a shunt circuit around the neon lamp 66 includes a normally closed contact 56b on the relay 56a. Preferably each relay 55a, 56a is provided with a time delay pickup device TD as shown.

As indicated at FIG. 1, a dual level overvoltage detection device 35 of the type illustrated at FIG. 2 is connected between each adjacent pair of the paralleling buses 26–31 and thus across each parallel-con nected group of capacitors 20, 21 etc. Preferably the voltage dividers 50, 51 of adjacent detectors 35 are oppositely oriented so that the measuring capacitors 51 and adjacent pair of detectors are connected together at alternate paralleling buses, as at buses 27 and 29. Thus while the paralleling buses 26–31 are at successively higher potentials between ground and the high voltage terminal 32, only a low potential difference exists in operation between the signal generating circuits of pairs of detectors so connected to a common bus. At this low potential difference each light guide 36, 36a, 37, 37a (FIG. 1) may serve adjacent pairs of detectors at adjacent voltage levels.

It will be understood by those skilled in the art that other signal generating means responsive to operation of the relays 55a, 56a may be used. For example, the relay contacts 55b, 56b may be utilized to actuate separate radio transmitters having discrete frequencies and coupled, respectively, to receivers electrically remote from any high potential point.

It will now be understood by those skilled in the art that in operation, if one or more of the individual capacitor fuses 20a, 21a, 22a, 23a in one or more of the groups of parallel-connected capacitors interrupts disconnects a capacitor, as due to excessive voltage across the capacitor, less capacitors then remain in parallel circuit relation in the faulted capacitor group. As a consequence the voltage division between the paralleling buses 26–31 is changed to the extent that the voltage drop across any faulted group of paralleled capacitors increases. If this increase amounts to 10% so that 110% of normal voltage is applied to the associated measuring capacitor 51, the relay 55a will pick up after a time delay to open its contact 55b (FIG. 2). The neon bulb 65 is thereby energized to generate an overvoltage signal at a first level. This signal is transmitted through the light guide 36 to the control unit 38 where it actuates the light responsive diode 41 to complete a circuit through a warning indicator lamp 45 (FIG. 1). The overvoltage relay 55a is energized only on alternate half cycles of voltage through a circuit which includes the blocking diode 57. If additional fused capacitors become disconnected so that voltage across any electrically adjacent pair of paralleling buses 26–31 increases to 120% of normal, the Zener diode 60 breaks down to energize relay coil 56 on opposite half cycles of voltage and to energize the neon lamp 66. This second level overvoltage signal from lamp 66 is transmitted through the associated light guide 37 to the control unit 38 where it actuates the light responsive diode 42, thereby to energize the trip coil 46 of circuit breaker 25 and remove the entire capacitor bank from the power line.

While I have illustrated only a preferred embodiment of my invention by way of illustration many modifications will occur to those skilled in the art and I therefore wish to have it understood that I intend in the appended claims to cover all such modifications as fall within the true spirit and scope of my invention.

What I claim as new and desire to secure by Letters Patent of the United States is:

1. A shunt capacitor bank for connection between high voltage terminals of an alternating current electric power supply system comprising, a plurality of serially connected groups of capacitors connected in parallel circuit relation between pairs of paralleling buses, serially intermediate buses being common to serially adjacent groups of paralleled capacitors, an individual protective fuse connected in series with each said capacitor between adjacent buses defining a capacitor group, an impedance voltage divider connected in shunt circuit relation with each said capacitor group and including a measuring impedance defining a measuring potential small in proportion to voltage across the associated capacitor group, a pair of oppositely poled unilaterally conductive signal generating circuits connected across said measuring impedance, each said signal generating circuit including a voltage responsive discharge device operable to energize said circuit, said discharge devices being operable in response to different levels of abnormally high measuring potential, and control means separately responsive to energization of said signal generating circuits.

2. A capacitor bank according to claim 1 wherein said control means comprises indicating means operable in response to an overvoltage signal of low level and means for disconnecting said capacitor bank from said power supply system in response to an overvoltage signal of high level.

3. A capacitor bank according to claim 1 wherein the measuring impedance in each said voltage divider is electrically adjacent one terminal of said voltage divider and said intermediate paralleling buses are connected to said one terminal in each of an electrically adjacent pair of voltage dividers.

4. A capacitor bank according to claim 3 including, a pair of light signal generators controlled by the signal generating circuits associated with each said voltage divider, a single pair of light transmitting channels interposed between said control means and the light signal generators of each said adjacent pair of voltage dividers, each said channel being coupled to a generator of like overvoltage signals from both voltage dividers of said pair of voltage dividers, and means maintaining said control means near ground potential.

5. In a shunt capacitor bank for connection between ground potential and a high voltage terminal of an alternating current power supply system, a plurality of serially connected groups of capacitors connected in parallel circuit relation between pairs of paralleling buses, each electrically adjacent pair of paralleling buses including therebetween a single group of paralleled capacitors and serially intermediate buses being connected to serially adjacent groups of capacitors, an overvoltage detection device connected between each serially adjacent pair of said paralleling buses, each said detection device including between its terminals a voltage divider and optical signal generating means electrically adjacent one terminal of said device, each said intermediate paralleling bus being connected to said one terminal of a pair of said detection devices, control means at substantially ground potential, and a plurality of optical signal transmission channels between said control means and said detection devices, each said channel being coupled to both of one said pair of detection devices.

6. A shunt capacitor bank according to claim 1 wherein said impedance voltage divider is a capacitive voltage divider and said measuring impedance is a capacitor.

7. In an overvoltage detection device, capacitor means having a single pair of terminals adapted for connection to a source of alternating potential subject to variation, a pair of voltage responsive electric discharge devices each connected directly between said terminals in a single unilaterally conductive circuit, said unilaterally conductive circuits being oppositely poled for conduction on opposite half cycles of said alternating potential and said discharge devices being operable at discretely different levels of said alternating voltage above a predetermined normal value, and signal generating means separately responsive to voltage break down of said discharge devices.

\* \* \* \* \*